United States Patent
Dickey

[11] 3,877,610
[45] Apr. 15, 1975

[54] HOT MELT CARTRIDGE ADHESIVE GUN

[75] Inventor: Herbert C. Dickey, North Reading, Mass.

[73] Assignee: Ornsteen Chemicals and Textiles Co., Inc., Seabrook, N.H.

[22] Filed: Feb. 1, 1974

[21] Appl. No.: 438,730

[52] U.S. Cl. ......................................... 222/146 HE
[51] Int. Cl. .............................................. B67d 5/62
[58] Field of Search ......... 222/146 HE, 146 R, 387, 222/504, 389, 326, 327

[56] References Cited
UNITED STATES PATENTS

| | | |
|---|---|---|
| 2,773,496 | 12/1956 | Czarnecki ..................... 222/146 HE |
| 3,237,814 | 3/1966 | Collar ............................ 222/387 X |
| 3,428,001 | 2/1969 | Zwart, Jr. et al. ............... 222/146 R |
| 3,587,930 | 6/1971 | Schultz ........................ 222/146 HE |

*Primary Examiner*—Stanley H. Tollberg
*Attorney, Agent, or Firm*—Weingarten, Maxham & Schurgin

[57] ABSTRACT

A hot melt adhesive gun employing a cartridge of thermoplastic adhesive contained within a chamber to which, upon actuation of a trigger mechanism, pressurized air is directed for urging the cartridge into melting contact with a heater plate, the melted adhesive being driven from a gun nozzle for application to a bonding surface. The gun nozzle includes a valve also pneumatically operative upon actuation of the trigger mechanism to permit molten adhesive flow.

15 Claims, 5 Drawing Figures

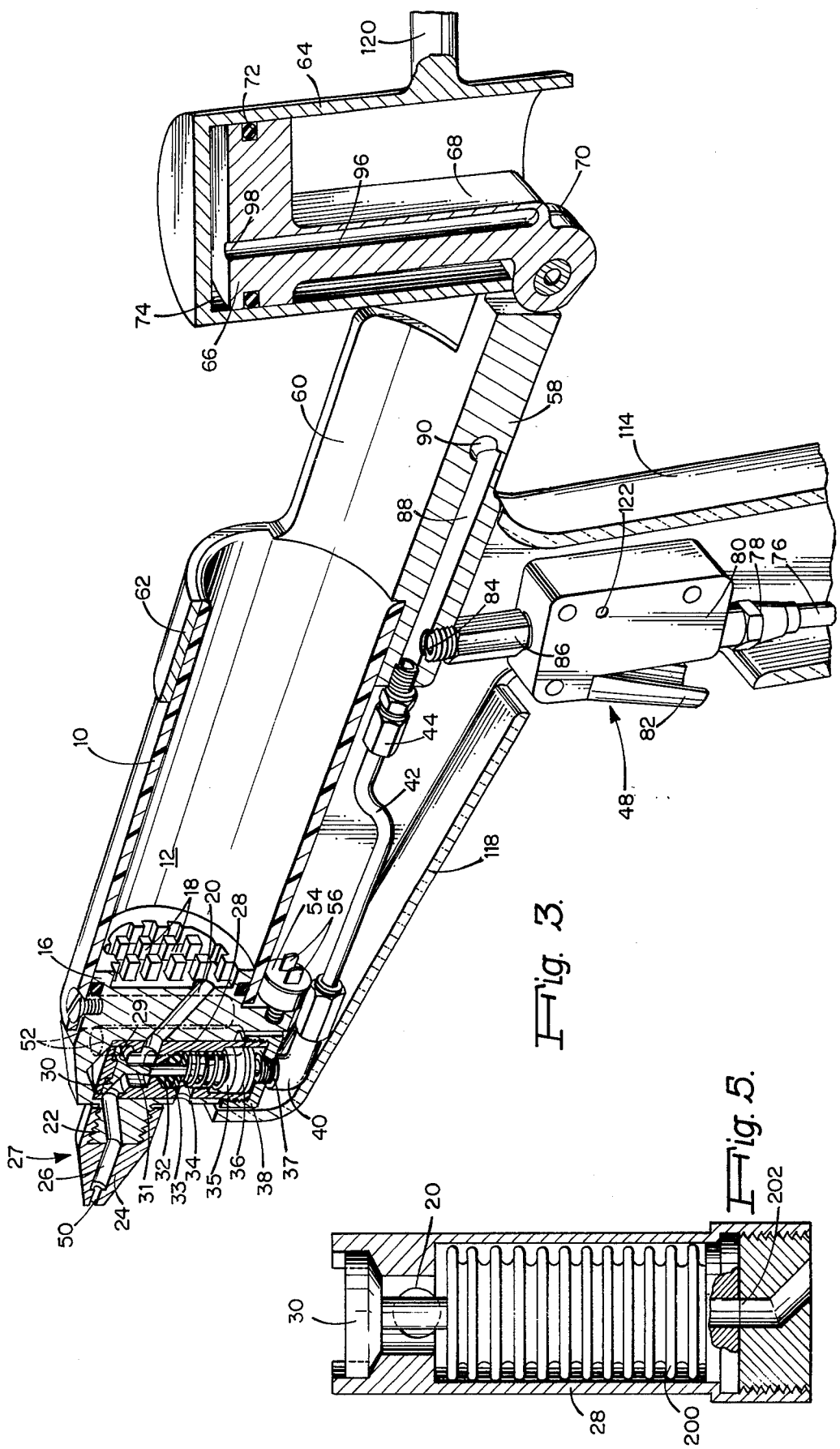

3,877,610

HOT MELT CARTRIDGE ADHESIVE GUN

FIELD OF THE INVENTION

This invention relates to adhesive dispensing apparatus and more particularly to a hot melt adhesive gun employing a cartridge of normally solid adhesive which in a molten state is applied to a working surface.

BACKGROUND OF THE INVENTION

Hot melt adhesive guns are known for application of a melted thermoplastic adhesive onto a work surface on which the adhesive solidifies to form a requisite bond. One class of hot melt guns employs a cartridge of normally solid thermoplastic adhesive contained within a chamber in which the cartridge or a portion thereof is heated and melted and by pneumatic action urged through a nozzle of the gun for dispensing onto a working surface. Pneumatic action is usually provided by the introduction of air or other gas of suitable operating pressure into the chamber such as by means of a manually actuable trigger valve to force molten adhesive through the gun nozzle. A gun of this type is shown in U.S. Pat. No. 3,764,045 assigned to the assignee of this invention and which includes apparatus for preventing blockage of the air supply line which can be caused by the backup of molten adhesive within the gun chamber.

In other known hot melt guns, a piston is disposed within a chamber and is pneumatically driven along the length of the chamber to urge the adhesive cartridge forward and force melted adhesive through the gun nozzle. This latter type of gun is shown, for example, in U.S. Pat. No. 3,587,930 wherein an adhesive chamber is formed by registered first and second cavities with a forward cavity being heated to provide a reservoir of molten adhesive and the rearward cavity being sufficiently cooler to maintain the adhesive in solid form and including a pneumatically driven piston in sliding engagement with the rearward cavity wall. During operation, air is continuously applied to the piston with adhesive flow being governed by trigger actuation of a needle valve mechanically linked to the trigger. A problem with adhesive guns of this type in which a slidable piston is employed to drive the adhesive within the chamber is that adhesive can build up on the interior chamber wall and interfere with the sliding seal of the piston. Melted adhesive can also flow around the piston seal with possible damage to the pneumatic apparatus. Guns of conventional construction have often also been difficult to load with an adhesive cartridge. For example, in the gun of the aforesaid U.S. Pat. No. 3,587,930, the gun is opened by releasing a latch, pivoting the registered cavities and inserting adhesive cartridges into both cavities, and since the chamber is continuously pressurized, means must be provided for disabling the supply pressure before the gun is opened for loading.

SUMMARY OF THE INVENTION

In accordance with the invention, a hot melt adhesive gun is provided in which the adhesive chamber containing a cartridge of thermoplastic adhesive is maintained in a substantially cool condition except at the forward end thereof, at which heating is desired for melting of a portion of the adhesive cartridge for dispensing through the nozzle of the gun. The pneumatic assembly for driving the adhesive forward in the chamber is of a construction providing complete isolation of the pneumatic seal from possible contamination by spuriously flowing melted adhesive. The pneumatic assembly includes a stationary piston disposed within a cylindrical member which is slidable with respect to the stationary piston upon pneumatic actuation. The cylindrical member is mounted for slidable movement within the adhesive chamber to urge the adhesive forward for melting and dispensing. The chamber is readily opened by retraction of the driving cylinder for loading of adhesive into the gun, and the novel gun provides automatic deactivation of the pneumatic assembly when the chamber is opened, for safety purposes. Upon actuation of the trigger, air of suitable operating pressure is applied to the pneumatic assembly for urging the adhesive forward into engagement with the heater plate, and is also operative to open the nozzle valve to permit flow of melted adhesive from the nozzle onto a working surface.

Upon release of the trigger, operating pressure is removed both from the pneumatic assembly and from the nozzle valve to permit closure of the valve to discontinue adhesive flow and to discontinue driving of the gun cylinder. The pneumatic assembly is also vented upon trigger release to rapidly depressurize the driving assembly.

The adhesive chamber is formed of a thermally insulative material having thermal properties approximately the same as those of the adhesive itself. Heat is provided only at the forward end of the chamber near the gun nozzle, with the heat remaining localized in the region requiring heat by the thermal properties of the chamber housing and the adhesive itself. No additional means are needed, such as air flow, to cool the adhesive chamber as is often done in prior art gun construction. Molten adhesive which may tend to flow rearward toward the driving cylinder solidifies upon reaching the relatively cool chamber wall and forms a seal with the chamber wall against further backflow of adhesive. The solidified glue provides in effect a close fitting adhesive piston which is propelled forward upon actuation of the trigger.

DESCRIPTION OF THE DRAWINGS

The invention will be more fully understood from the following detailed description taken in conjunction with the accompanying drawings in which:

FIG. 3 is a sectional pictorial view of the embodiment of FIG. 1 further illustrating the construction thereof;

FIG. 5 is a cutaway sectional elevation view of an alternative nozzle valve useful in the invention.

DETAILED DESCRIPTION OF THE INVENTION

Figure 1:
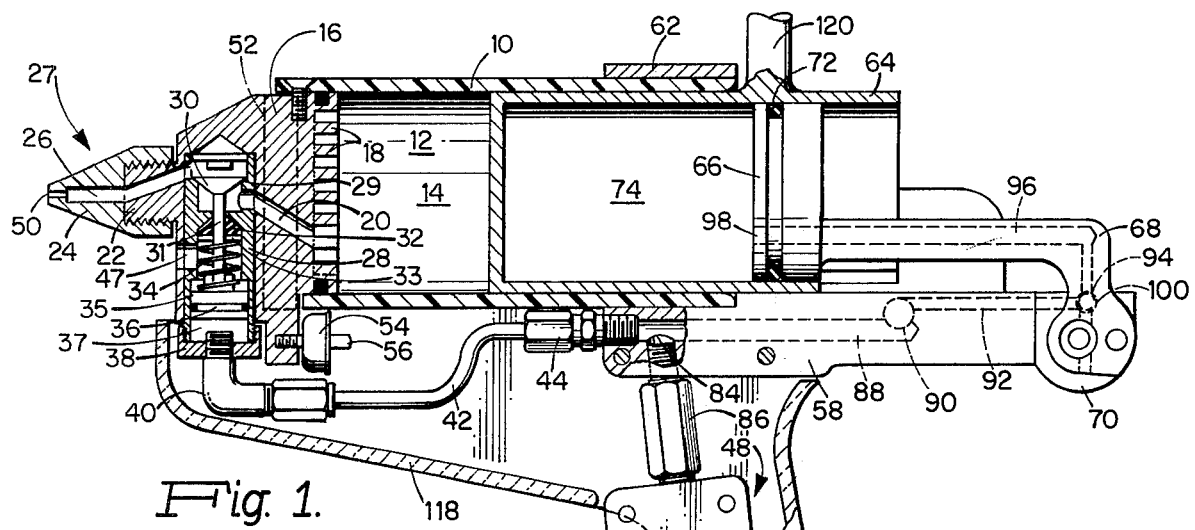
FIG. 1 is a sectional elevation view of an adhesive gun according to the invention.

Referring to FIG. 1 there is shown a hot melt adhesive gun having an elongated cylindrical tube 10 defining a cylindrical chamber 12 in which a cartridge 14 of thermoplastic adhesive is contained for melting and subsequent dispensing from the gun nozzle onto a work surface. The cylindrical tube 10 is formed of a thermally insulative material, such as silicone impregnated glass fabric or reinforced Teflon, and is attached at the forward end thereof to a heater block 16 which includes on the side confronting chamber 12 a waffle-like array of projections 18 into engagement with which adhesive cartridge 14 is urged for rapid melting. A passage 20 extends from the surface confronting chamber 12 through block 16 which is threadably attached via a nipple portion 22 to a nozzle 24 having an opening 26 in communication with passage 20.

A nozzle valve 27 is provided in block 16 to open and close passage 20, and includes a cylindrical housing 28 disposed within an opening in block 16 and secured such as by set screws (not shown) and having a conical seating surface 29 at the upper end thereof which mates with a valve member 30. Member 30 includes a stem 31 around which is fitted a Teflon seal 32, washer 33, spring 34, and piston 35 which is in sliding engagement with the confronting surface of housing 28 and in sealing relationship therewith such as by an O-ring seal 36. A cap member 38 is threaded onto housing 28 to secure the valve assembly, and a pneumatic fitting 40 is threaded onto cap 38 and to which a pneumatic tube 42 is coupled for connection via fitting 44 to a trigger assembly 48. The nozzle valve 27 can be constructed as a separate assembly and inserted into heater block 16 for use.

A breather hole 47 communicates between the interior of housing 28 and the working atmosphere to allow the escape of air during upward movement of piston 35. Trapped air is thus prevented from impairing valve operation. This breather hole also provides a leakage path for any melted glue which might leak past seal 32. With valve member 30 seated against associated surface 29, passage 20 is blocked to prevent flow of melted glue through the nozzle orifice 50. With operating pressure applied to chamber 37, by actuation of trigger assembly 48, piston 35 is driven upward against the urging of spring 34, as seen in FIG. 3, causing valve member 30 to unseat from surface 29 to permit the flow of melted adhesive through passage 20 and thence through passage 26 for emission from exit orifice 50 of the nozzle which can be of any suitable configuration for particular working requirements.

The heater block 16 is formed of a thermally conductive material such as aluminum, and includes one or more electrical heaters 52 disposed therein for heating the block and projections 18 to an operating temperature sufficient to melt the adhesive cartridge 14 driven into engagement with projections 18. A thermostat 54 is affixed to block 16 and is connected by leads 56 to the electrical power source for interruption thereof to maintain the operating temperature within a predetermined temperature range, in a manner well known in the art.

The cylindrical chamber 10 is affixed at its rearward end to a saddle plate 58 which extends rearwardly from tube 10. Plate 58 includes an annular surface 60 of substantially the same diameter as that of the chamber 12 and in alignment therewith to serve as an extension of the lower portion of the chamber for the loading of an adhesive cartridge into chamber 12. Plate 58 includes a cylindrical collar portion 62 which surrounds and engages the rearward end of tube 10 for support thereof. A cylindrical cup shaped member 64 is slidably disposed within chamber 12 with the closed end confronting projections 18. A piston plate 66 is disposed within the cylindrical opening of member 64 and is integral with a rearwardly extending member 68 which is pivotally affixed to plate 58 by means of swivel coupling 70. Piston plate 66 sealingly engages the confronting surface of member 64, such as by an O-ring seal 72, such that chamber 74 defined by the interior of member 64 and the confronting surface of piston plate 66 can be pressurized to cause slidable movement of cylinder member 64 into chamber 12.

It will be appreciated that member 64 functions as a movable cylinder with respect to stationary piston 66, in contrast to the usual circumstances where a piston is movable with respect to a stationary cylinder. By use of a movable cylinder, the seal between the cylinder and its associated piston is isolated from the melted glue within chamber 12, as a result of which the melted glue cannot interfere with the pneumatic apparatus of the gun.

Operating gas of suitable operating pressure, usually pressurized air, is applied from a suitable source (not shown) via input tube 76 and fitting 78 to trigger assembly 48 which includes a trigger valve 80 which is normally closed and which upon actuation of trigger 82 is opened to permit flow of operating gas via tube 42 and fitting 40 to nozzle valve 27, and via passages in plate 58 and member 68 to chamber 74. More particularly, plate 58 includes a passage 84 communicating with a coupling 86 which, in turn, is connected to trigger valve 80, and which passage is in fluid communication with elongated passage 88, cross passage 90 and elongated passage 92 which terminates at a port 94 near the rearward end of plate 58.

Figure 2:
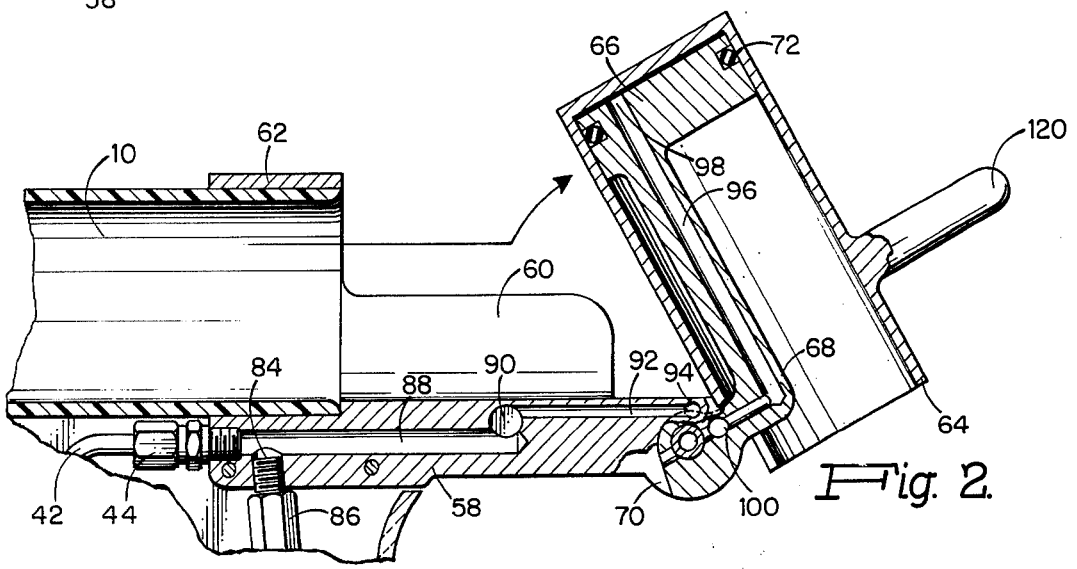
FIG. 2 is a cutaway sectional elevation view of the embodiment of FIG. 1 illustrating the movable cylinder in a raised position.

Member 68 includes a passage 96 which extends from a port 98 at the surface of piston 66 within chamber 74 and which terminates at the opposite end of member 68 at a port 100 in alignment with port 94 when member 68 is in the closed position, as shown in FIG. 1, with cylinder 64 slidably disposed for movement within chamber 12. With member 68 in a raised position, as illustrated in FIGS. 2 and 3, port 100 is not in fluid communication with port 94 such that operating gas cannot be transmitted to chamber 74 with cylinder 64 outside of its operating position within chamber 12. The decoupling of ports 94 and 100 is provided upon relatively slight angular movement of swivel 70 and which decoupling provides a major safety feature of the invention, as inadvertent actuation of trigger 82 with member 68 in a raised position will not cause forward propulsion of cylinder 64. Moreover, air trapped in chamber 74 prevents movement of cylinder 64 when the gun is in an opened condition.

Figure 4:
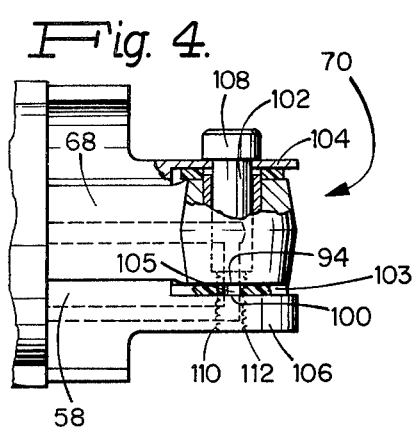
FIG. 4 is a cutaway top bottom of a portion of the embodiment of FIG. 1 showing the swivel assembly.

As seen most clearly in FIG. 4, the swivel 70 includes a pin 102 disposed in aligned openings provided in flanges 104 and 106 of plate 58. Pin 102 includes a head portion 108 and a threaded portion 110 threadably secured within the associated threaded portion of opening 112. A Teflon or other suitable washer 103 is provided between flange 106 and member 68 and is keyed to align an opening 105 of washer 103 with ports 94 and 100. Pin 102 is tightened sufficiently to provide proper fluid sealing between confronting ports 94 and 100 and washer 103 interposed therebetween, while still permitting pivotal movement of member 68 relative to plate 58 when desired for loading of the gun or for cleaning and maintenance purposes. The flange 104 is substantially thinner than flange 106 and is deflectable under tightening of pin 102 in order to maintain good fluid sealing between ports 94 and 100 and washer 103 even as the confronting surfaces containing these parts wear during use.

A handle 114 is affixed to plate 58 and contains trigger assembly 48, the input pneumatic tube 76 typically extending from the bottom of the handle for connection to an operating gas source. A cover plate 118 shields tube 42 and its associated fittings and electrical wiring to heaters 52 and thermostat 54.

As mentioned above, the tube 10 defining chamber 12 is of a thermally insulative material to minimize the conduction of heat to the gun exterior and to the adhesive cartridge. The glue cartridge 14 is itself a good thermal insulator nearly that of tube material and thus the heat provided by heater block 16 remains concentrated near this block and the operating temperature of tube 10 remains relatively low. The heater block 16 and the pneumatic drive components are typically fabricated of aluminum and, of course, can be of any suitable materials to suit specific performance requirements.

The gun is loaded by retracting cylinder 64 by means of a handle portion 120 out of chamber 12 and onto extension surface 60, this cylinder being placed in its raised position as shown in FIG. 3 and glue cartridge 14 inserted within chamber 12. Cylinder 64 is then returned to its downward position and pushed forward into chamber 12 and into engagement with cartridge 14. Upon actuation of trigger 82, pressurized gas is directed via the passages in plate 58 and member 68 into chamber 74 to force cylinder 64 inward of chamber 12 and thereby urge cartridge 14 into engagement with heated projections 18 for melting of the confronting portions of the cartridge. Operating gas is also applied via tube 42 and fitting 40 to the nozzle valve 27 to cause opening of the valve to permit conveyance of melted glue from chamber 12 via passages 20 and 26 out through nozzle 24 for application to a work surface.

Upon release of trigger 82, trigger valve 80 is closed to prevent further application of pressurized gas to cylinder 64 and to nozzle valve 27, causing closure of nozzle valve 27 and discontinuance of propulsion of cylinder 64. With trigger valve 80 in its closed position, the valve output is vented to the atmosphere such as by vent port 122 to provide an exhaust path for residual gas within chambers 74 and 37. Thus, upon release of trigger 82 pneumatic operation is immediately discontinued with consequent stoppage of adhesive propulsion in chamber 74 and adhesive flow from nozzle orifice 50.

An alternative form of nozzle valve is shown in FIG. 5 in which a closed bellows 200 disposed within housing 28 serves both as an expansible element for operation of valve member 30 and as a spring member for retaining the valve member in a normally closed position in the absence of applied pressure applied to inlet passage 202. Various other modifications and alternative implementations can be made without departing from the true scope of the invention. Accordingly, it is not intended to limit the invention by what has been particularly shown and described except as indicated in the appended claims.

What is claimed is:

1. A hot melt adhesive gun for use with a cartridge of normally solid thermoplastic adhesive, said gun comprising:

a housing of thermally insulative material defining a chamber adapted to contain a cartridge of normally solid thermoplastic adhesive and being sufficiently cool to retain said adhesive cartridge in substantially solid form;

nozzle means at the discharge end of said chamber;

heater means disposed at the discharge end of said chamber and into engagement with which said adhesive cartridge is urged to melt a confronting quantity thereof;

normally closed pneumatically actuable valve means coupled to said nozzle means;

manually actuable pneumatically operative trigger means adapted for coupling to a source of operating gas of predetermined operating pressure;

a pneumatic assembly at the end of said chamber opposite to said heater means and including:

driving means disposed for sliding movement in said chamber;

means for pneumatically coupling said trigger means to said driving means;

venting means communicating with the working atmosphere;

said trigger means being operative upon actuation to apply operating gas to said driving means to urge said means and an adhesive cartridge in said chamber into engagement with said heater means;

said trigger means being operative upon deactuation to discontinue application of operating gas to said driving means and for coupling said pneumatic assembly to said venting means.

2. The invention according to claim 1 wherein said driving means includes:

means for coupling said trigger means to said valve means;

said trigger means being operative upon actuation to apply operating gas to said valve means to cause opening thereof, and being operative upon deactuation to discontinue application of operating gas to said valve means and for coupling said valve means to said venting means.

3. The invention according to claim 1 wherein said driving means includes a cylindrical member disposed for sliding movement in said chamber and having a closed end confronting said heater means and an opposite open end; and a piston disposed in fixed axial position in the open end of said cylindrical driving member slidably engaging and in gas sealing relationship with the confronting wall thereof.

4. The invention according to claim 2 wherein said valve means includes:

spring means urging said valve into a normally closed position;

piston means operative upon actuation of said trigger means to urge said valve into an open position; and means for venting said valve cylinder to prevent trapped air in said valve cylinder during opening of said valve.

5. The invention according to claim 1 wherein said heater means includes:

a block of thermally conductive material having a plurality of projections confronting said chamber and into engagement with which said adhesive cartridge is urged for melting;

at least one electrical heating element disposed in said block for heating said block to an operating temperature sufficient to melt said adhesive in engagement with said projections;
a passage in said block coupling the surface containing said projections to said valve means; and
a passage in said block coupling said valve means and said nozzle means.

6. The invention according to claim 5 wherein said valve means is disposed in said heater block.

7. The invention according to claim 2 wherein said valve means includes:
a valve member in normally closed sealing relationship with a confronting seating surface;
bias means urging said valve member into a normally closed sealing position; and
pneumatic means for urging said valve member into an open position upon application of operating gas.

8. The invention according to claim 7 wherein said bias means includes a spring urging said valve member into a normally closed position.

9. The invention according to claim 7 wherein said bias means includes a bellows expansible upon application of said operating gas to urge said valve member into an open position and providing a bias force for returning said valve member to a closed position in the absence of said operating gas.

10. The invention according to claim 1 wherein said heater means includes:
a block of thermally conductive material having on the side confronting said chamber a plurality of projections confronting said chamber and into engagement with which said adhesive cartridge is urged for melting, said projections defining a plurality of communicating channels; and
a passage in said block coupling said communicating channels to said valve means.

11. The invention according to claim 1 wherein said driving means includes:
a cylindrical member disposed for sliding movement in said chamber and having a closed end confronting said heater means and a cylindrical chamber;
a piston plate disposed in fixed axial position within the chamber of said cylindrical member and in slidable gas sealing engagement with the confronting wall thereof;
said means for coupling said trigger means to said driving means including means for applying operating gas to the chamber of said cylindrical member to urge said cylindrical member toward said heater means.

12. The invention according to claim 11 wherein said pneumatic assembly includes:
a plate outwardly extending from said housing and having a surface which is an extension of a portion of said chamber within said housing;
said cylindrical member being slidable onto said extension surface upon retraction from said housing chamber; and
means for rotating said cylindrical member to an open position to permit access to said housing chamber for the loading of adhesive therein.

13. The invention according to claim 12 wherein said rotation means includes means for decoupling the fluid coupling between said trigger means and said driving means to deactivate said driving means when said cylindrical member is in an open position.

14. The invention according to claim 13 wherein said outwardly extending plate includes fluid passages as part of said means for coupling said trigger means to said driving means.

15. The invention according to claim 11 wherein said pneumatic assembly includes:
a plate outwardly extending from said housing and having a surface which is an extension of a portion of said chamber within said housing;
said cylindrical member being slidable onto said extension surface upon retraction from said housing chamber;
a support member affixed to said piston plate and pivotally attached to the outer end of said plate;
said support member and piston plate being rotatable to a closed position at which said cylindrical member is slidable in said housing chamber and to an open position upon retraction of said cylindrical member from said housing chamber to permit access to said housing chamber for the loading of adhesive therein;
said outwardly extending plate and said support member including fluid passages for coupling said trigger means to said chamber of said cylindrical member;
coupling means at said pivotal attachment between said outwardly extending plate and support member for providing fluid coupling therebetween when said support member is in said closed position and for providing fluid decoupling therebetween when said support member is in said open position.

* * * * *